United States Patent [19]

Black

[11] Patent Number: 5,420,882
[45] Date of Patent: May 30, 1995

[54] INFRARED $CO_2$ LASER WITH A BLUE-GREEN AIMING BEAM

[75] Inventor: Michael Black, Foster City, Calif.

[73] Assignee: Reliant Technologies, Inc., Foster City, Calif.

[21] Appl. No.: 255,437

[22] Filed: Jun. 8, 1994

[51] Int. Cl.$^6$ .............................................. H01S 3/08
[52] U.S. Cl. ................................. 372/108; 372/98; 372/99; 372/107
[58] Field of Search .................. 372/92, 108, 107, 99, 372/98

[56] References Cited

U.S. PATENT DOCUMENTS

| | | | |
|---|---|---|---|
| 4,922,501 | 5/1990 | Wolgast | 372/99 |
| 4,969,156 | 11/1990 | Schiller et al. | 372/89 |
| 5,317,589 | 5/1994 | Ogawa et al. | 272/99 |

*Primary Examiner*—Léon Scott, Jr.

[57] ABSTRACT

An apparatus confocally delivers to an object an infrared $CO_2$ laser beam and a highly visible (e.g., blue-green) aiming beam. The beams from the two lasers are coaxially superimposed by means of a plate which transmits visible light and reflects infrared light. The resulting two coaxial beams are then guided to the object by means of reflective surfaces. Reflective beam guidance provides coincident focus of the infrared and aiming beams with unprecedented precision and also permits the combination of an infrared beam with a highly visible aiming beam.

10 Claims, 3 Drawing Sheets

INFRARED CO₂ LASER WITH A BLUE-GREEN AIMING BEAM

BACKGROUND OF THE INVENTION

This invention relates to lasers, and in particular to the use of a visible laser beam to aim an infrared $CO_2$ laser beam.

Since lasers have found applications in a wide variety of fields, the methods for precisely and conveniently delivering laser energy have been of great importance. Many laser applications such as welding and surgery often require the delivery of a high power infrared laser beam, e.g., a $CO_2$ laser beam. Because an infrared laser beam is not visible, however, it is difficult to determine where the beam is being directed. Consequently, many delivery systems employ an additional visible laser whose beam is coaxially superimposed on the infrared beam, thus providing a method for aiming.

This combination of infrared and visible lasers, however, has several difficulties which originate in the fact that the conventional method for delivering laser beams employs refractive lenses to focus and guide the laser beams.

The first problem is imprecise aiming. Because of the frequency difference between visible and infrared light, chromatic aberration causes the lenses of the delivery system to refract visible and infrared light rays at slightly different angles. This divergence causes the two beams to be focused at different locations upon delivery. In precision applications, however, it is crucial that the aiming beam and the infrared beam are focused at the same location.

The second problem with the conventional method for delivering both visible and infrared laser light is the necessity to use a red aiming beam due to the inherent limitations in optical materials. Because a single system of lenses must guide both the visible and infrared beams, the lenses must be composed of materials that transmit the light from both the visible and infrared $CO_2$ lasers. Since most materials have limited transmission ranges, this places significant restrictions on the types of materials which may be used for lenses. For example, although glass and quartz transmit visible light, they are both opaque to the 10.6 μm light from a $CO_2$ laser (see FIG. 3).

There are materials which do transmit both visible light and infrared $CO_2$ laser light, but many of them are either toxic or unstable and are therefore not suitable for practical applications. Although there are a few suitable materials which transmit both visible light and infrared $CO_2$ laser light, the visible light which they do transmit is restricted to the red end of the spectrum. For example, the most suitable material, zinc selenide, has a transmission range from 600 nm up to 18 μm, which includes the 10.6 μm light from a $CO_2$ laser but only the orange and red portion of the visible spectrum from 600 nm to 770 nm (see FIG. 3). Consequently, all aiming beams for infrared laser delivery are presently restricted to the red end of the spectrum above 600 nm.

Red light, however, is an ineffective color for an aiming beam. In surgical applications, for example, one usually delivers the laser beam to a red target such as the liver or bloody tissue. In this situation a red aiming beam is difficult to see against the red background. Moreover, the human eye is not as sensitive to red light as it is to other colors, making a red aiming beam inherently difficult to see. In short, the red aiming beams presently required for infrared laser delivery are imprecise and difficult to see.

SUMMARY OF THE INVENTION

Accordingly, the primary object of this invention is to combine an infrared $CO_2$ laser beam with a highly visible (e.g., blue-green) aiming beam precisely focused at the same point as the infrared beam. This new combination is impossible to achieve using refractive delivery systems. In place of refractive optical guidance, the delivery system of this invention employs reflective optical guidance, and as a consequence it avoids the precision and visibility problems of present systems.

More specifically, reflective guidance systems do not have chromatic aberration since both visible light and infrared light are reflected in an identical manner. Consequently, the two beams are confocally delivered precisely at the same point on an object, thus permitting laser operations with unprecedented accuracy. Moreover, reflective delivery systems do not have the material limitations of refractive delivery systems since there are suitable materials which have high reflectance values throughout the whole visible and infrared range. This permits, in particular, the novel combination of an infrared $CO_2$ laser with a highly visible aiming beam. In particular, it allows the combination of a $CO_2$ laser with a blue-green aiming beam. The great advantage of this new combination is that a blue-green beam provides ten times better contrast against a red background than does a red beam. Moreover, the human eye is seven times more sensitive to blue-green light than to red light, making blue-green a much more effective color to use for an aiming beam.

In short, through the use of reflective optical guidance, the combination of an infrared $CO_2$ laser with a visible aiming beam other than red results in greater precision and greater visibility. Further objects and advantages of this invention will become apparent from a consideration of the drawings and ensuing description.

BRIEF DESCRIPTION OF DRAWINGS FIGURES

Reference Numerals in Drawings

Figure 1:
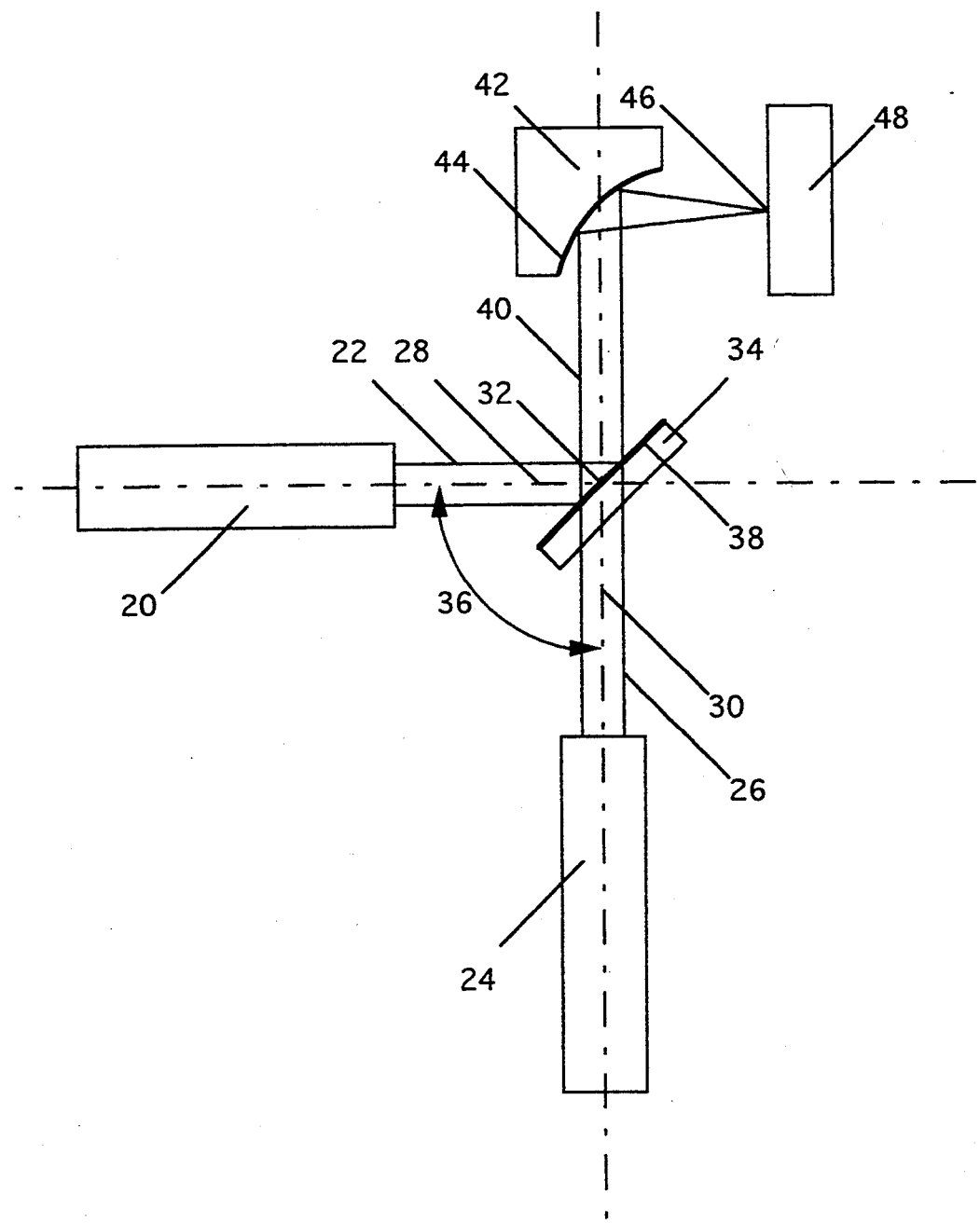
FIG. 1 is a cross-sectional view of a preferred embodiment of the invention.

20 $CO_2$ laser
22 infrared beam
24 aiming laser
26 aiming beam
28 infrared beam axis
30 aiming beam axis
32 point of intersection
34 flat plate
36 relative angle
38 flat plate coating
40 coaxial beams
42 guidance element
44 reflective coating
46 focal point 48 object
50 directing plate
52 reflective coating

DETAILED DESCRIPTION

A preferred embodiment of the invention is shown in FIG. 1. A $CO_2$ laser 20 generates an invisible infrared beam 22 whose wavelength is 10.6 μm. An aiming laser 24 generates a visible aiming beam 26 whose wavelength is between 400 nm and 600 nm. For example, the aiming laser 24 may be an argon laser producing a multiline beam in the blue-green range from 455 nm to 577 nm, or a helium-cadmium laser producing a single-line violet beam at 441.6 nm. Both $CO_2$ lasers and aiming lasers of this type are commercially produced for industrial and scientific applications and are widely available.

In this embodiment the $CO_2$ laser 20 and aiming laser 24 are positioned so that the infrared beam axis 28 and the aiming beam axis 30 have a relative angle 36 equal to 90 degrees at a point of intersection 32. A flat plate 34 is positioned at the point of intersection 32 so that it bisects the relative angle 36 between the infrared beam axis 28 and the aiming beam axis 30. The flat plate 34 may be composed of any material transparent to the aiming beam 26, e.g., glass or quartz. The side of the flat plate 34 which faces the incident infrared beam 22 has a flat plate coating 38 which transmits the aiming beam 26 but reflects the infrared beam 22. Coatings with this property are commercially produced and are available from OCLI Corp., Santa Rosa, Calif. Consequently, the aiming beam 26 is transmitted through both the plate 34 and coating 38 while the infrared beam 22 is reflected off the coating 38. The transmitted aiming beam 26 is thus superimposed on the reflected infrared beam 22 resulting in two coaxial beams 40.

The coaxial beams 40 are focused by means of a reflective guidance element 42 having a concave surface covered with a reflective coating 44. The reflective coating 44 is composed of a material which reflects both the aiming beam 26 and the infrared beam 22. Such coatings are commercially available from Balzers Limited, Liechtenstein. After reflecting off the coating 44, the coaxial beams 40 are focused at the same point 46. An object 48 to be treated by the infrared beam 22 from the $CO_2$ laser 20 is positioned near the focal point 46. Since the coaxial beams 40 are reflectively guided, they experience no chromatic aberration and are precisely focused at the same point. Moreover, since the color of the aiming beam makes it highly visible, the focal point 46 can be clearly seen and located with great accuracy.

Figure 2:
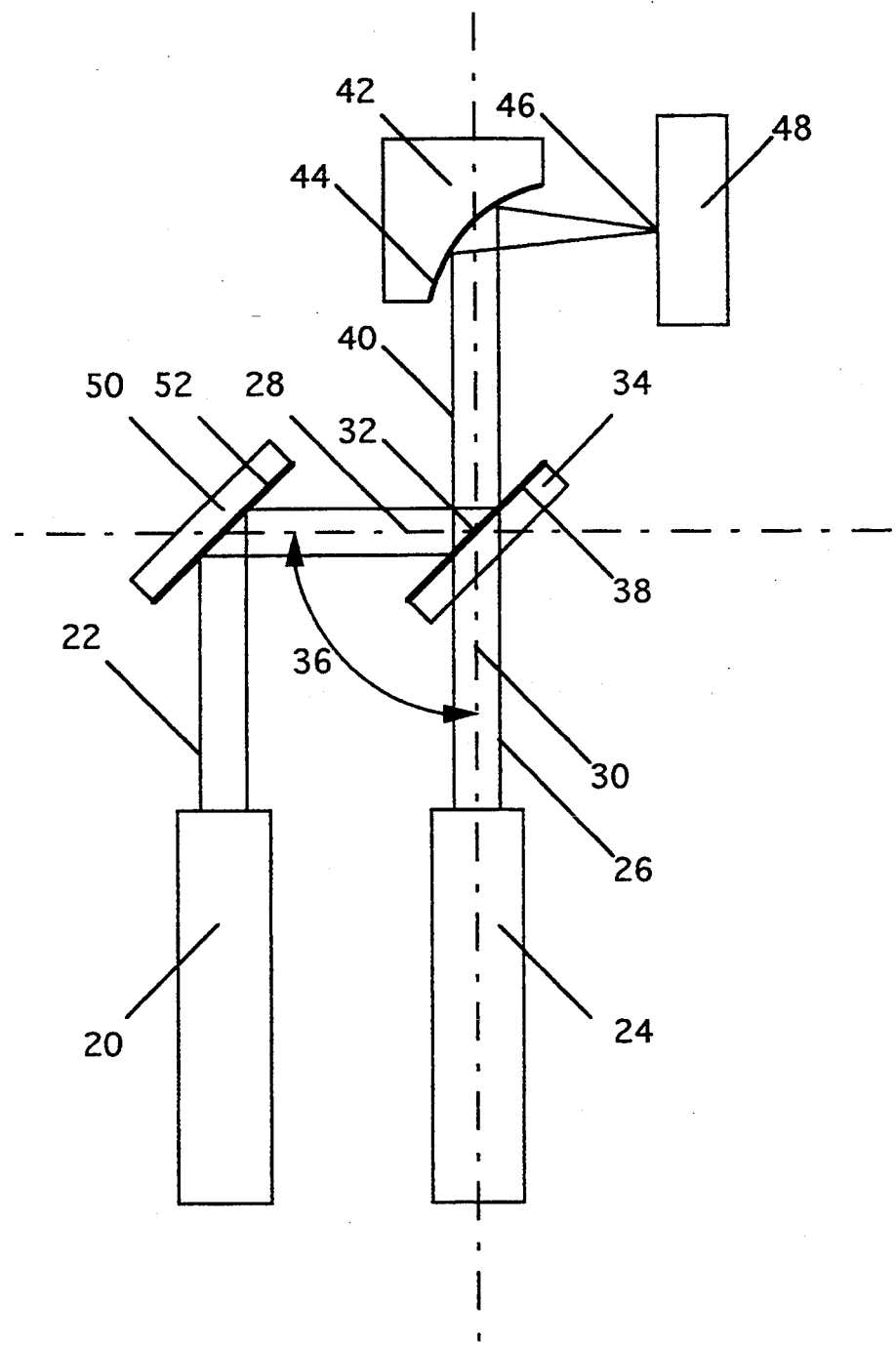
FIG. 2 is a cross-sectional view of an embodiment employing an infrared reflector to direct the beams from the two lasers into intersection.

FIG. 2 shows an alternate embodiment of the invention which employs a method for directing the two laser beams into an intersection. In this embodiment the infrared laser 20 and aiming laser 24 are not required to generate intersecting beams. To bring the beams into intersection a directing plate 50 with a reflective coating 52 is introduced in the path of the infrared beam 22. The reflective coating 52 is composed of a material which reflects the infrared beam 22. For example, the reflective coating 52 may be composed of the same material as the reflective coating 44 on the reflective guidance element 42. After the infrared beam 22 from the $CO_2$ laser 20 is reflected off the coating 52, its axis 28 intersects with the aiming beam axis 30 at a point of intersection 32, as in the previous embodiment. The structure and function of this alternate embodiment is otherwise identical to that of the previous embodiment.

SUMMARY, RAMIFICATIONS, AND SCOPE

Thus the reader will see that this invention combines an infrared $CO_2$ laser beam with a highly visible aiming beam, precisely focusing both beams at the same point.

While the above description contains many specificities, these should not be construed as limitations on the scope of the invention, but rather as an exemplification of particular embodiments thereof. Many other variations are possible.

Figure 3:
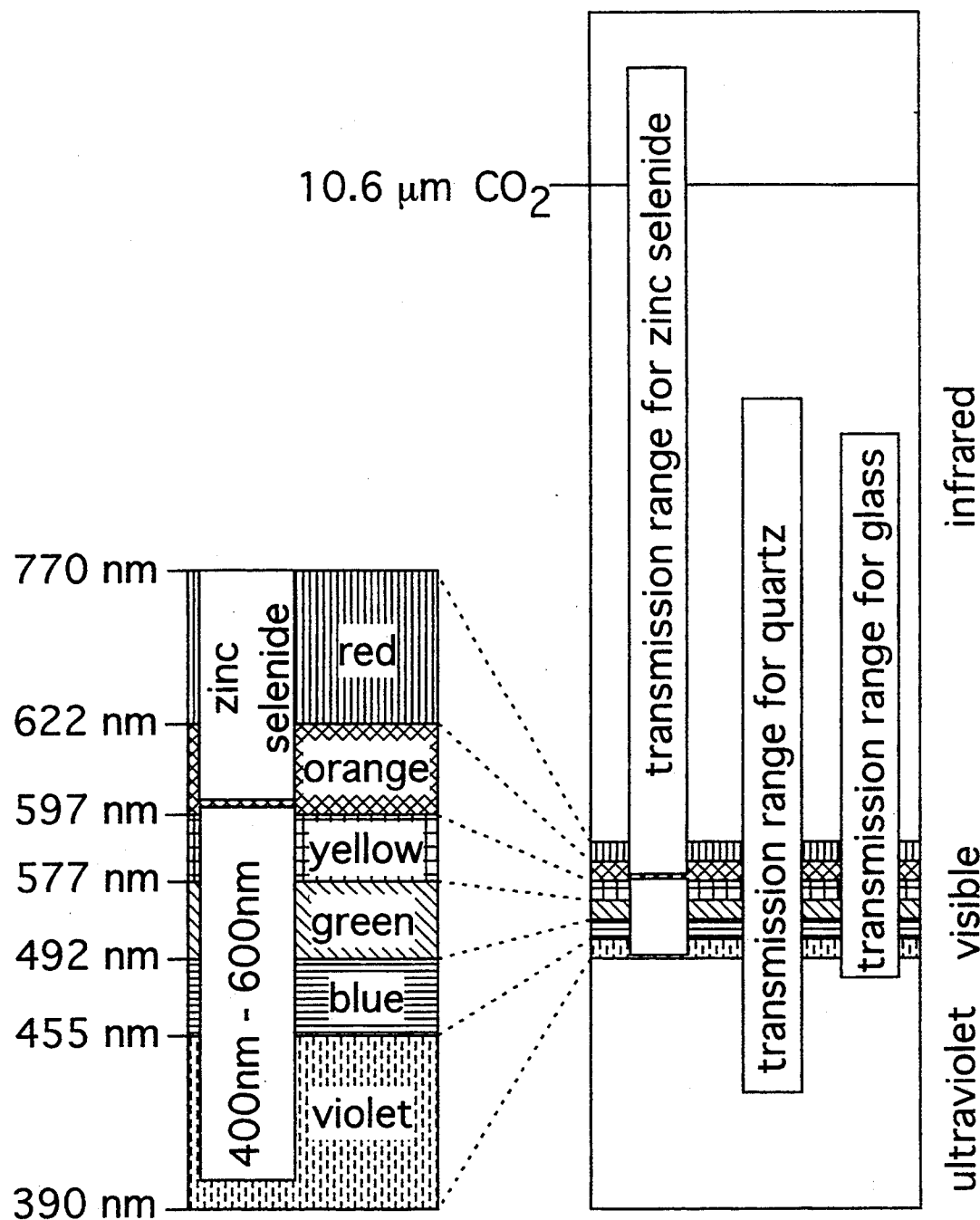
FIG. 3 shows the ultraviolet, visible and infrared spectrum with various colors indicated as well as the transmission range for zinc selenide and the wavelength of the infrared beam from a $CO_2$ laser.

For example, the aiming laser can be any laser which produces an aiming beam having a wavelength in the range from 400 nm to 600 nm, i.e. violet, blue, green, and yellow (see FIG. 3); the flat plate and its coating may be composed of any two materials both of which transmit the aiming beam and the latter of which reflects the infrared beam; alternatively, the flat plate and its coating may be composed of any two materials both of which transmit the infrared beam and the latter of which reflects the aiming beam; the reflective coating on the guidance element may be composed of any material that reflects both the infrared beam and the aiming beam; the reflective coating on the directing element may be composed of any material that reflects the beam it is used to direct; the relative angle at the point of intersection between the infrared beam axis and the aiming beam axis may take on various values; numerous directing plates may be combined to direct the infrared beam and the aiming beam into an intersection; and numerous reflective guidance elements may be combined to guide the coaxial beams to the object.

Accordingly, the scope of the invention should be determined not by the embodiments illustrated, but by the appended claims and their legal equivalents.

I claim:

1. An apparatus for confocally delivering to an object an infrared beam of light having a wavelength substantially equal to 10.6 μm and an aiming beam of light having a wavelength in the range 400 nm to 600 nm, said apparatus comprising:

a $CO_2$ laser which generates said infrared beam;

an aiming laser which generates said aiming beam, said aiming laser positioned such that the axis of said aiming beam intersects the axis of said infrared beam at a point of intersection, where the axis of said aiming beam and the axis of said infrared beam intersect at a relative angle substantially different from 180 degrees and from zero degrees;

a combining means for superimposing said aiming beam on said infrared beam to form two coaxial beams; and a reflective guidance means for confocally delivering said coaxial beams to said object, said reflective guidance means comprising a guidance element whose surface is coated with a material reflecting both said aiming beam and said infrared beam.

2. The apparatus of claim 1 wherein said combining means comprises:

a flat plate positioned at said point of intersection with an orientation bisecting said relative angle, said flat plate being transparent to said aiming beam; and a flat plate coating on the side of said flat plate facing said infrared beam, said flat plate coating being transparent to said aiming beam and reflecting said infrared beam.

3. The apparatus of claim 2 wherein said aiming beam has a wavelength in the range 455 nm to 577 nm, i.e. has a blue-green color.

4. The apparatus of claim 1 wherein said combining means comprises:
- a flat plate positioned at said point of intersection with an orientation bisecting said relative angle, said flat plate being transparent to said infrared beam; and
- a flat plate coating on the side of said flat plate facing said aiming beam, said flat plate coating being transparent to said infrared beam and reflecting said aiming beam.

5. The apparatus of claim 4 wherein said aiming beam has a wavelength in the range 455 nm to 577 nm, i.e. has a blue-green color.

6. An apparatus for confocally delivering to an object an infrared beam of light having a wavelength substantially equal to 10.6 $\mu$m and an aiming beam of light having a wavelength in the range 400 nm to 600 nm, said apparatus comprising:
- a $CO_2$ laser which generates said infrared beam;
- an aiming laser which generates said aiming beam;
- a combining means for superimposing said aiming beam on said infrared beam to form two coaxial beams; and
- a reflective guidance means for confocally delivering said coaxial beams to said object, said reflective guidance means comprising a guidance element whose surface is coated with a material reflecting both said aiming beam and said infrared beam.

7. The apparatus of claim 6 wherein said combining means comprises:
- a directing means for causing the axis of said aiming beam to intersect with the axis of said infrared beam at a point of intersection, where the axis of said aiming beam and the axis of said infrared beam intersect at a relative angle substantially different from 180 degrees and from zero degrees;
- a flat plate positioned at said point of intersection with an orientation bisecting said relative angle, said flat plate being transparent to said aiming beam; and
- a flat plate coating on the side of said flat plate facing said infrared beam, said flat plate coating being transparent to said aiming beam and reflecting said infrared beam.

8. The apparatus of claim 7 wherein said aiming beam has a wavelength in the range 455 nm to 577 nm, i.e. has a blue-green color.

9. The apparatus of claim 6 wherein said combining means comprises:
- a directing means for causing the axis of said aiming beam to intersect with the axis of said infrared beam at a point of intersection, where the axis of said aiming beam and the axis of said infrared beam intersect at a relative angle substantially different from 180 degrees and from zero degrees;
- a flat plate positioned at said point of intersection with an orientation bisecting said relative angle, said flat plate being transparent to said infrared beam; and
- a flat plate coating on the side of said flat plate facing said aiming beam, said flat plate coating being transparent to said infrared beam and reflecting said aiming beam.

10. The apparatus of claim 9 wherein said aiming beam has a wavelength in the range 455 nm to 577 nm, i.e. has a blue-green color.

* * * * *